Dec. 13, 1966 P. W. BLACK 3,292,085
COMBINED ENCODER-DECODER DEVICE PROVIDING RAPID BUILD UP OF OSCILLATIONS
Filed Sept. 18, 1963
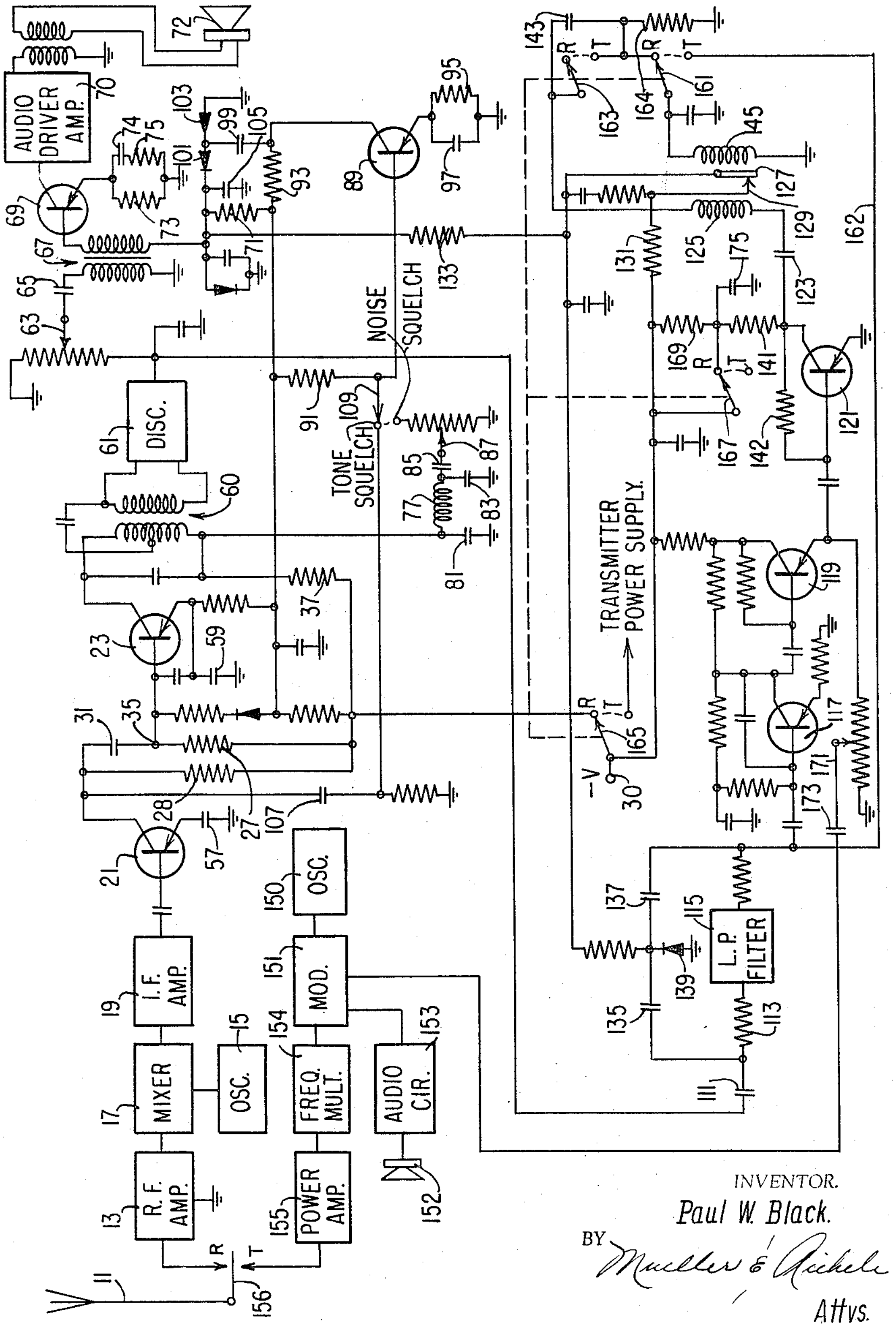
INVENTOR.
Paul W. Black.
BY Mueller & Aichele
Attys.

United States Patent Office 3,292,085

Patented Dec. 13, 1966

3,292,085

COMBINED ENCODER-DECODER DEVICE PROVIDING RAPID BUILD UP OF OSCILLATIONS

Paul W. Black, Harvey, Ill., assignor to Motorola, Inc., Chicago, Ill., a corporation of Illinois Filed Sept. 18, 1963, Ser. No. 309,768
7 Claims. (Cl. 325—18)

This invention relates to two-way radio transmitting and receiving equipment, and more particularly to a combination encoder-decoder system for two-way radio equipment adapted for coded tone operation.

Two-way portable radio equipment providing both transmitting and receiving functions in a single unit requires simple and dependable circuitry in the form of a compact and rugged unit. Optimum portability necessitates that the equipment be small and light in weight for easy handling. The difficulties in achieving these optimum conditions are increased when additional features are required, as in coded tone systems in which the receivers are responsive only to messages transmitted in connection with a coded tone of a particular frequency. Coded tone operation requires a tone source, such as an oscillator, for the transmitting function to provide the tone of the particular frequency which is transmitted to the receivers, and further requires a frequency responsive device in each receiver that will cause the receiver in which it is incorporated to operate upon receipt of the coded tone signals.

Since amplification is generally required for both an oscillator and a frequency responsive device, and furthermore, since both the oscillator and the frequency responsive device require a resonant unit that will be responsive to the particular coded tone frequency, it has been proposed to combine the oscillator and the frequency responsive device, or encoder and decoder systems, using a single amplifier and frequency responsive unit with switchable circuitry to enable selective operation in either encoder or decoder modes. Because of the high feedback when operating in encoder mode, it is generally desirable that the amplifier have lower gain than when operating in decoder mode. Nevertheless, because the time required for oscillations in the oscillator to build up to a usable amplitude may be undesirably long if the gain of the amplifier is at the reduced level, it may be desirable to operate the amplifier at the high gain in encoder mode until the amplitude of the oscillations has reached a usable level.

Accordingly, an object of the invention is to provide a combination encoder-decoder device wherein oscillations during encoder mode build up to a usable amplitude very rapidly.

It is a further object of this invention to provide a two-way portable radio unit adapted for coded tone operation, in which the encoder and decoder systems are combined by improved circuitry.

Another object of the invention is to provide a simple and inexpensive combination encoder-decoder for a two-way portable radio which occupies a minimum of space provides dependable operation.

A feature of the invention is the provision, in a combination encoder-decoder device for selective signaling two-way radio apparatus, of an oscillator which operates at reduced bias for reduced gain in encoder mode.

Another feature of the invention is the provision, in the above oscillator, of a time delay network which maintains a higher bias on the amplifier for a period of time after switching from decoder to encoder operation to permit oscillations to build up to a usable amplitude.

Still another feature of the invention is the provision, in a combination encoder-decoder device incorporating an oscillator which operates at higher bias during decoder operation, of a resistance-capacitance storage circuit maintaining higher bias on the oscillator for a period of time after switching from decoder to encoder operation sufficient to permit oscillations to build up to a usable amplitude.

The drawing is a schematic diagram of two-way radio apparatus incorporating the invention.

In practicing the invention, two-way radio apparatus is provided with a squelch circuit and a combination encoder-decoder device. The encoder-decoder is comprised of an amplifier and a frequency responsive unit which incorporates a mechanically resonant member responsive to a tone signal of a particular frequency. The device further includes circuitry interconnecting the amplifier and the frequency responsive unit, which circuitry includes a plurality of switches selectively operable to cause the device to function in encoder or decoder operation. When operating as a decoder, audio signals from the receiver of the two-way radio apparatus are applied to the amplifier and amplified to drive the frequency responsive unit. Upon receipt of tone signals of the predetermined frequency, the frequency responsive unit will provide a control signal to the squelch circuit to remove squelch bias from the audio amplifier and unsquelch the receiver. When the device is operating as an encoder, signals from the frequency responsive unit are fed back to the input of the amplifier to cause the device to oscillate at the resonant frequency of the mechanically resonant member. This provides the tone signal, which is taken from the oscillator and applied to the modulator of the transmitter to modulate the transmitted signal with a coded tone. The gain of the amplifier is reduced after oscillations are initiated to hold the oscillations at the desired level.

Referring now to the drawing, there is shown a radio transmitter-receiver system incorporating the invention. Radio frequency signals are applied from antenna 11 to radio frequency amplifier 13, heterodyned with oscillations from oscillator 15 in mixer 17 to produce intermediate frequency signals, and then amplified in intermediate frequency amplifier 19. Signals from intermediate frequency amplifier 19 are applied to an amplitude limiter circuit including transistors 21 and 23. The intermediate frequency output of amplifier 19 drives transistor 21 which has its emitter electrode connected through capacitor 57 to ground. Transistor 21 limits the amplitude of the intermediate frequency signals and its output is applied through capacitor 31 to resistor 27. This limited signal appearing at point 35 drives transistor 23. Transistor 23 has its emitter electrode connected to ground through capacitor 59. Current for transistor 21 is provided through resistor 28 from a source of negative potential 30, and current for transistor 23 is provided from source 30 through decoupling resistor 37.

The output of transistor 23 is applied through transformer 60 to discriminator 61. Discriminator 61 provides audio output signals which are applied through volume control 63, capacitor 65 and transformer 67 to an audio amplifier stage 69. Bias is provided for transistor 69 through resistor 71 and the emitter electrode of transistor 69 is connected to ground through resistor 73 in parallel with series connected capacitor 74 and resistor 75. Amplified audio signals will appear at the collector electrode of transistor 69. These are passed on to drive amplifier 70 which drives speaker 72.

Squelch action is provided by taking the detected noise signals appearing across the decoupling resistor 37 and passing them through a low pass filter network including choke 77 and capacitors 81, 83 and 85. Low frequency noise from the filter network is passed through adjustable squelch control 87 and through switch 109 to the base of the squelch amplifier transistor 89 to be amplified thereby. Bias for squelch amplifier 89 is provided through resistors 91 and 93, and the emitter of squelch amplifier 89 is connected to ground through the parallel combination of resistor 95 and capacitor 97. The output of squelch amplifier 89 is coupled through capacitor 99 to a voltage doubler network comprised of diodes 101 and 103 and capacitor 105. This rectified voltage is applied to the base electrode of transistor 69 to cut off the audio output thereof.

An intermediate frequency signal will be present at the collector of transistor 21, which signal may consist of the carrier signal at the intermediate frequency or noise signals centered about the intermediate frequency. This signal will be of substantially constant amplitude and is coupled through a capacitor 107 and switch 109 to the base of squelch amplifier 89. This signal may also be amplified by squelch amplifier 89 and applied through the voltage doubler network to the base of transistor 69 to bias the same to cutoff. It will be apparent therefore that according to the setting of switch 109 either noise signals detected across resistor 37 or intermediate frequency signals at point 35 may be used to cause the squelch amplifier to squelch the audio.

When the receiver is to be operated in a conventional manner with the private line function turned off, switch 109 will be moved to the opposite setting from that shown. In that position, the receiver will operate to reproduce all received signals of the frequency to which it is tuned and will squelch the audio in the presence of noise of relatively high amplitude resulting from the absence of received carrier.

On the other hand, when switch 109 is moved to the on position as shown, the audio will be squelched continuously due to the amplification by squelch amplifier 89 of intermediate frequency signals at the collector of transistor 21. The receiver may be unsquelched only by the presence of a coded tone signal in a received carrier, as will be explained subsequently.

A portion of the output of discriminator 61 is applied through capacitor 111 and resistor 113 to a low pass filter 115. Audio frequency signals from low pass filter 115 are then applied to the base electrode of a first transistor 117. These signals are amplified in transistor 117 and applied to the base electrode of a second transistor 119. The emitter electrode of transistor 119 is coupled to the base electrode of a third transistor 121 which is connected through capacitor 123 to the driving coil 125 of a frequency responsive device. This device may consist of a vibratory reed 127 having a preselected resonant frequency at the frequency of the coded tone signal to be selected.

If the audio frequency signals amplified by transistors 117, 119 and 121 include a coded tone signal of the resonant frequency of reed 127, reed 127 will vibrate to engage contact 129 and apply voltage from source 30 through resistors 131 and 133 and through diodes 101 and 103 to ground. When diodes 101 and 103 are biased in this manner, the output of squelch amplifier 89 will be shunted through diode 103 to ground, unsquelching transistor audio stage 69. Thus, upon receipt of a coded tone signal, the receiver portion of the two-way radio unit will be actuated to reproduce the transmitted audio signal. At all other times it will be held biased off or squelched due to the continuous presence of intermediate frequency signals at the collector of transistor 21 which are amplified by transistor 89. It should be noted that the decoder device operates when switch 109 is in either position. Accordingly, if squelch control 87 is set for high tight squelch conditions, the receiver will still be unsquelched upon receipt of a coded carrier of low strength.

In the absence of a carrier signal, capacitors 135 and 137 act to bypass high frequency signals about low pass filter 115. Transistor 117 provides limiting action to permit this high frequency noise to override any transistory low frequency noise which, if amplified and applied to coil 125, might cause false closure of contact 129 even though a coded tone signal is not present. As carrier frequency is fed into the receiver, the high frequency noise bypassing the low pass filter 115 is quieted or diminished in magnitude and the low frequency may again take over. To further insure this, engagement of contact 129 by reed 127 applies forward bias to a diode switch 139, shunting the bypass circuit to prevent any high frequency noise reaching the base of transistor 117.

In decoder mode, transistor 121 is forward biased from source 30 by a resistor 142 connected across the base and collector electrodes thereof. Current for resistor 142 is supplied from source 30 through switch 167 and resistor 141. The emitter electrode of transistor 121 is grounded. Coil 125 is connected in series with coil 145 through a capacitor 143 to improve the response of reed member 127. Coil 145 is the second coil of the frequency responsive unit and is inductively coupled to coil 125 by reed member 127.

The transmitter section of the radio includes oscillator 150 which applies high frequency signals to modulator 151. Microphone 152 applies audio signals to an amplifier and processing unit 153, also connected to modulator 151. The frequency modulated signals are applied to frequency amplifier 154 which brings them to the desired frequency and deviation, and then to power amplifier 155 which raises the level to the desired value. The signals are then appleid to antenna 11 through switch 156 and transmitted. Switch 156 may be ganged with the other encoder-decoder switches to be explained.

When it is desired to transmit, the coded tone signal is developed by converting the frequency responsive decoder device to an oscillator for encoder operation. Switch 161 is moved to transmit position to decouple sensing coil 145 from its series connection with coil 125, and to connect coil 145 through a feedback lead 162 to the base of transistor 117. Switch 163 is moved to the transmit position to ground coil 125 across a load resistor 164. Power supply switch 165 is moved from received to transmit position to remove potential from the receiver portion of the apparatus and apply it to the transmitter power supply for the modulator, frequency multiplier, etc. Switch 167, when moved to transmit position, interposes a dropping resistor 169 between source 30 and resistor 141. It will be apparent that the bias potential across resistor 142 will be dropped to a lower level during encoder operation to operate transistor 121 at a lower gain. A lower gain is desirable because the strong feedback signals might overtax the components of the oscillator. The coded tone is derived through a potentiometer 171 on the base of transistor 119 and is applied through a capacitor 173 to the modulator 151.

It is desirable that the oscillations of the device, when operating in encoder mode, reach a usable amplitude as quickly as possible. Of course, if the device were operated at the bias potential of decoder operation, the oscillations would build up rapidly, but then would build up to such a high amplitude as to shift the resonant frequency of the device. This is the reason that the device is operated at a lower bias potential in encoder mode. Nevertheless, to bring the amplitude of vibration up to usable levels rapidly, storage capacitor 175 is connected to the juncture between resistors 169 and 141. When the switch 167 is in the receive position, the potential across capacitor 175 will equal the potential at source 30. When switch 167 is moved to the transmit position for encoder operation, the time required for capacitor 175 to discharge through resistor 141 will maintain the higher bias on transistor 121 for a period of time sufficient to permit oscillations to build up to a usable amplitude rapidly. Once capacitor 175 has discharged, the amplifier will operate at the lower bias potential.

It may therefore be seen that the invention provides a dependable and simple two-way radio system adapted for coded tone operation. A switching arrangement allows simple conversion from transmitter to receiver operation including conversion of a single circuit from encoder to decoder operation. The encoder-decoder circuit utilizes substantially the same elements for both modes of operation, simplifying use and reducing cost. When the encoder-decoder circuit is switched from decoder to encoder mode, vibrations are brought to a usable amplitude rapidly by means of a unique time delay network which is of extremely simple circuitry.

What is claimed is:

1. A combination encoder-decoder device for use in selective signaling two-way radio apparatus and operable in encoder mode to provide tone oscillations and in decoder mode to provide a control signal in response to a received tone, said device including in combination, an amplifier, a frequency responsive unit coupled to the output of said amplifier and providing a control signal for the receiver upon receipt of signals of a predetermined frequency from said amplifier, said amplifier having a bias circuit for controlling the gain thereof according to the magnitude of bias potential applied thereto, means for applying a predetermined bias potential to said bias circuit for decoder operation, and switch means selectively operable to feed back signals from said frequency responsive unit to the input of said amplifier for operation in encoder mode, said switch means having provision for changing the predetermined bias potential applied to said bias circuit when said device is operating in encoder mode, said bias circuit having storage means therein maintaining the predetermined bias potential of decoder mode operation for a period of time after said switch means is operated, to permit oscillations to build up to a desired amplitude.

2. A combination encoder-decoder device for use in selective signaling two-way radio apparatus and operable in encoder mode to provide tone oscillations and in decoder mode to provide a control signal in response to a received tone, said device including in combination a frequency responsive unit having driving means, sensing means and vibratory means coupling said driving means to said sensing means and responsive to a predetermined frequency, an amplifier connected to drive said driving means and having a bias circuit for controlling the gain thereof according to the magnitude of bias potential applied thereto, means applying a predetermined bias potential to said bias circuit during decoder operation, said frequency responsive unit providing a control signal for the receiver upon receipt of signals of a predetermined frequency from said amplifier, and switch means selectively operable to connect said sensing means to the input of said amplifier to feed back signals thereto for operation in encoder mode, said switch means having provision for reducing the predetermined bias potential applied to said bias circuit when said device is operating in encoder mode, said bias circuit having a resistance-capacitance storage circuit therein maintaining the predetermined bias potential of decoder mode operation for a period of time after said switch means is operated to permit oscillations to build up to a desired amplitude.

3. A combination encoder-decoder device for use in selective signaling two-way radio apparatus and operable in encoder mode to provide tone oscillations and in decoder mode to provide a control signal in response to a received tone, said device including in combination, a frequency responsive unit having driving means, sensing means and vibratory means coupling said driving means to said sensing means and responsive to a predetermined frequency, an amplifier having a transistor stage connected to drive said driving means, a bias circuit connected to said transistor stage for controlling the gain thereof according to the magnitude of bias potential applied to said bias circuit, means applying a predetermined bias potential to said bias circuit during decoder operation, and switch means selectively operable to connect said sensing means to the input of said amplifier to feed back signals thereto for operation in encoder mode, said switch means having provision for reducing the predetermined bias potential applied to said bias circuit when said device is operating in encoder mode, said bias circuit having a resistance-capacitance storage circuit therein maintaining the predetermined bias potential of decoder mode operation for a period of time after said switch means is operated to permit oscillations to build up to a desired amplitude.

4. A combination encoder-decoder device for use in selected signaling two-way radio apparatus and operable in encoder mode to provide tone oscillations and in decoder mode to provide a control signal in response to a received tone, said device including in combination, a frequency responsive unit having driving means, sensing means and vibratory means coupling said driving means to said sensing means and responsive to a predetermined frequency, an amplifier having a transistor stage with input, output and control portions and with the output portion of said transistor stage coupled to said driving means for driving the same, said frequency responsive unit providing a control signal for the receiver upon receipt by said driving means of signals of the predetermined frequency from said amplifier, resistance means connected to said control portion of said transistor stage for controlling the gain thereof according to the magnitude of bias potential applied to said resistance means, means applying a predetermined bias potential to said resistance means during decoder operation, switch means selectively operable to connect said sensing means to the input of said amplifier to feed back signals thereto for operation in encoder mode, said switch means having provision for reducing the predetermined bias potential applied to said resistance means when said device is operating in encoder mode, and a resistance-capacitance storage circuit connected to said resistance means and maintaining the predetermined bias potential of decoder mode operation applied to said resistance means for a period of time after said switch means is operated to permit oscillations to build up to a usable amplitude.

5. A combination encoder-decoder device for use in selective signaling two-way radio apparatus and operable in encoder mode to provide tone oscillations and in decoder mode to provide a control signal in response to a received tone, said device including in combination, a frequency responsive unit having driving means, sensing means, and vibratory means coupling said driving means to said sensing means and responsive to a predetermined frequency, an amplifier having a transistor stage with base, emitter and collector portions and with said collector portion coupled to said driving means to drive the same, said frequency responsive unit providing a control signal for the receiver upon receipt by said driving means of signals of a predetermined frequency from said transistor stage of said amplifier, means connecting said emitter portion of said transistor stage to a reference potential, a first resistor connected across said base and collector portions of said transistor stage for forward biasing the same, a source of negative D.C. potential, a second resistor and a third resistor connected in stated order from said source to said collector portion of said transistor stage for conveying bias potential thereto, switch means selectively operable to feed back signals from said sensing means of said frequency responsive unit to the input of said amplifier for operation in encoder mode, said switch means including means connecting the juncture between said second and third resistors directly to said source in decoder mode and disconnecting said juncture from said source in encoder mode to interpose said second resistor between said source and said third resistor, and capacitance means connected from the juncture between said second and third resistors to the reference potential and forming a resistance-capacitance storage network with said third resistor to maintain the predetermined bias potential of decoder mode operation on said emitter portion of said transistor for a period of time after said switch means is operated to permit oscillations to build up to a desired amplitude.

6. Two-way radio apparatus including in combination, a receiver portion having an audio frequency amplifier, a squelch circuit connected to said audio frequency amplifier, for squelching the receiver, first switch means selectively applying intermediate frequency signals and detected noise signals to said squelch circuit for amplification thereby, and a combination encoder-decoder device comprising an amplifier, a frequency responsive unit coupled to the output of said amplifier and providing a control signal to remove the effect of said squelch circuit upon receipt of signals of a predetermined frequency from said amplifier, said amplifier having a bias circuit for controlling the gain thereof according to the magnitude of bias potential applied thereto, means for applying a predetermined bias potential to said bias circuit for decoder operation, and second switch means selectively operable to feed back signals from said frequency response unit to the input of said amplifier for operation in encoder mode, said switch means having provision for changing the predetermined bias potential applied to said bias circuit when said device is operating in encoder mode, said bias circuit having storage means therein maintaining the predetermined bias potential of decoder mode of operation for a period of time after said second switch means is operated to permit oscillations to build up to a desired amplitude.

7. Two-way radio apparatus including in combination, a transmitter portion and a receiver portion having an audio amplifier, a squelch amplifier connected to said audio amplifier for applying cutoff bias thereto in response to signals applied to said squlech amplifier, first switch means selectively applying detected noise signals and intermediate frequency signals to said squelch amplifier to be amplified thereby, diode gate means connected between said squlech amplifier and said audio amplifier to shunt squelch bias from said audio amplifier in response to an applied control signal, and a combination encoder-decoder device comprising an amplifier, a frequency responsive unit coupled to the output of said amplifier and providing a control signal for said diode gate means upon receipt of signals of a predetermined frequency from said amplifier, said amplifier having a bias circuit for controlling the gain thereof according to the magnitude of bias potential applied thereto, means applying a predetermined bias potential to said bias circuit for decoder operation, and switch means selectively operable to feed back signals from said frequency responsive unit to the input of said amplifier for operation in encoder mode to supply tone signals to said transmitter portion, said second switch means having provision for changing the predetermined bias potential applied to said bias circuit when said device is operating in encoder mode, said bias cricuit having storage means therein maintaining the predetermined bias potential of decoder mode operation for a period of time after said second switch means is operated to permit oscillations to build up to a desired amplitude.

References Cited by the Examiner

UNITED STATES PATENTS

| | | | |
|---|---|---|---|
| 3,112,446 | 11/1963 | Wilson | 325—20 |
| 3,138,755 | 6/1964 | Kompelien | 325—18 |

DAVID G. REDINBAUGH, *Primary Examiner.*

JOHN W. CALDWELL, *Examiner.*